(12) United States Patent
White

(10) Patent No.: US 6,288,913 B1
(45) Date of Patent: *Sep. 11, 2001

(54) HIGH VOLTAGE POWER SUPPLY ALLOWING TRANSFORMERS TO BE RUN IN PARALLEL FOR HIGHER OUTPUT POWER

(75) Inventor: Robert K. White, Los Osos, CA (US)

(73) Assignee: Rantec Power Systems Inc., Los Osos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/559,271

(22) Filed: Apr. 27, 2000

(51) Int. Cl.[7] ................................................. H02M 3/335
(52) U.S. Cl. ................................. 363/16; 363/25; 363/133
(58) Field of Search ................................. 363/16, 24, 25, 363/131, 133, 134

(56) References Cited

U.S. PATENT DOCUMENTS

| | | |
|---|---|---|
| 4,124,885 | 11/1978 | Nordby . |
| 4,425,613 | 1/1984 | Shelly . |
| 4,763,237 | 8/1988 | Wieczorek . |
| 4,959,764 | 9/1990 | Bassett . |
| 5,448,204 | * 9/1995 | Gardner ................................... 331/25 |
| 5,856,736 | * 1/1999 | Rotunda et al. ...................... 318/802 |
| 6,108,215 | * 8/2000 | Kates et al. ............................. 363/17 |

OTHER PUBLICATIONS

Flanagan, William M., *Handbook of Transformer Applications*, 1986, Chapter 2: "Circuit Analysis", pp. 2.1 through 2.9; Chapter 3: "Circuit Performance of Power Transformers", pp. 3.1 through 3.12.
Rhea, Randall W., *Oscillator Design and Computer Simulation*, 1995, Chapter 8: "L–C Oscillators", pp. 191–212.
Severns, Rudolf P. and Bloom Gordon, *Modern DC–to–DC Switchmode Power Converter Circuits*, 1985, Section 7.3, pp. 169–171.

* cited by examiner

*Primary Examiner*—Adolf Deneke Berhane
(74) *Attorney, Agent, or Firm*—Pillsbury Winthrop LLP

(57) ABSTRACT

A power supply for achieving high output power levels at a high efficiency from a compact profile. The power supply includes a current regulator which receives a source voltage and outputs a signal having a constant current. The signal output from the regulator is provided to a center tap of a primary winding of a transformer. The ends of the primary winding of the transformer are connected to switches which are controlled by a switch driver. The transformer, switches and switch driver form a resonant oscillator. The switch driver is connected to a zero voltage level detector which detects when the voltage of the signal output from the current regulator reaches a zero level. When such a detection is made, the zero voltage level detector provides an enable signal to the switch driver to operate the switches in a push-pull mode. By operating the switches in a push-pull mode, the energy balance and resonance of the transformer can be maintained. This energy balance allows additional transformers to be connected directly in parallel to increase the output power capability.

33 Claims, 13 Drawing Sheets

IN CIRCUIT WIRING OF PARALLEL
TRANSFORMER CONNECTION

HIGH VOLTAGE POWER SUPPLY ALLOWING TRANSFORMERS TO BE RUN IN PARALLEL FOR HIGHER OUTPUT POWER

This application is related to U.S. patent application Ser. No. 08/962,762, filed Nov. 3, 1997, now U.S. Pat. No. 6,067,236 the contents of which are incorporated by reference herein.

BACKGROUND OF THE INVENTION

The present invention relates to a power supply for providing high voltage power from a low voltage source. The present invention can be manufactured so as to have a thin profile (less than 0.25 inch in width) and therefore is particularly well-suited for use as a power supply for a flat screen CRT (cathode ray tube).

Although the general concept of providing power conversion is known, the recently developed technology of flat screen CRTs has presented a greater need for power conversion circuitry capable of providing high voltage power from a low voltage source (e.g., 8,000 volts from a 5 volt source). In order to maximize the compactness of such flat screen CRTs, it is important that their power supplies also be compact. Further, in the highly competitive market for consumer electronics, it is important that the power supply be constructed at the lowest cost possible and therefore in a manner which permits automated manufacturing.

As is generally known by those skilled in the art, zero voltage switching of switches in electrical circuitry has been used to reduce the losses associated with opening and closing the switches. Thus, the switches have been operated in such a manner as to improve the efficiency of the electrical circuitry which incorporates the switches.

To increase the output power of conventional power supplies, two or more converters, including two or more transformers, two or more constant current sources and associated circuitry for each transformer, can be connected together. Alternatively, a power supply with increased output power has been provided by incorporating a larger transformer design. Thus, an increase in output power necessitates a much larger power supply design because of the increased number of components and/or a large transformer. The cost of manufacture is therefore increased and possibility of automated construction becomes limited. Moreover, if two or more converters are connected together to obtain an increased maximum output power, the multiple converters will often detrimentally interact with one another so that one or more of the transformer cores saturates.

SUMMARY OF THE INVENTION

It is therefore a primary object of the present invention to provide a power supply device capable of providing high voltage power from a low voltage source.

Another object of the present invention is to provide such a power supply device using components which facilitate automated manufacturing of the power supply device.

Another object of the present invention is to provide a power supply device having a high power output which can be manufactured to provide a thin overall profile of no more than 0.25 inches in width.

Another object of the present invention is to provide a power supply device having a high output-to-input voltage ratio (e.g., at least 500 times), compact size, and a relatively steady output voltage which remains within a close range of (e.g., at least within 10% or less) a desired voltage level, even if the load on the power supply varies significantly.

Another object of the present invention is to provide a power supply device including a resonant oscillator which is capable of maintaining a cycle to cycle flux balance of the transformer of the resonant oscillator and thus a cycle to cycle energy balance of the transformer. Due to the maintenance of the energy balance of the resonant oscillator's capacitive and inductive elements, the present invention allows multiple transformers to be connected together to form the resonant oscillator to thereby increase the maximum output power capability of the power supply device relative to a resonant oscillator having only a single transformer. The maximum output power capability thus increases as the number of connected transformers increases.

Another object of the present invention is to operate multiple transformers of a resonant oscillator at the natural resonant frequency of the equivalent inductive and capacitive elements forming the individual transformers so that the transformer cores can be prevented from saturating. Any detrimental interaction between the transformers is thus eliminated. The power supply of the present invention is therefore capable of providing power conversion in a highly efficient manner.

Another object of the present invention is to provide a power supply device in which multiple transformers of a resonant oscillator are connected directly in parallel to increase the output power capability with a lower number of components than what is conventionally required. Accordingly, the costs for constructing the power supply is relatively low since the same transformer design is used in the power supply device and the construction can be implemented by an automated process.

A power supply device according to the present invention therefore includes a current regulator, a resonant oscillator and a zero voltage level detector. The current regulator is connectable to a low voltage source (e.g., a 5 volt battery) and is arranged to provide a constant amount of current regardless of the changing load that is imposed on it.

The resonant oscillator preferably includes a first transformer, with its associated distributed capacitance and inductance, switches coupled to the primary winding and a switch driver for opening and closing the switches. The resonant oscillator receives a signal from the current regulator and transfers energy in a resonant fashion at the natural resonant frequency of its capacitive and inductive elements. The transfer is provided from the source to the capacitive and inductive elements of the transformer and to the load connected to the power supply.

The zero voltage level detector detects when the voltage level of a signal output from the current regulator reaches a zero level. In response to such a detection, the zero voltage level detector outputs an enable signal which triggers the switch driver to open and close the switches of the resonant oscillator so that a cycle to cycle energy energy balancebalance of the transformer of the resonant oscillator is maintained. That is, the resonance of the resonant oscillator is maintained through the operation of the zero voltage level detector to achieve a cycle to cycle balance of energy between the magnetic and capacitive elements of the resonant oscillator.

According to a preferred exemplary embodiment, the switches of the resonant oscillator are connected to opposite ends of the primary winding of the resonant oscillator and the current regulator is connected to a center tap of the primary winding. The switch driver receives the enable signal from the zero voltage level detector when the voltage level of the signal output from the current regulator reaches a zero level and opens and closes the switches in a push-pull mode in response to receiving the enable signal.

According to a preferred exemplary embodiment, the resonant oscillator can further include a second transformer which is connected in parallel to the primary winding of the first transformer. Through these two transformers, the output power capability of the power supply device can be increased (at least double) relative to a power supply device having only a single transformer. The transformers can be operated in a resonant mode at the natural resonant frequency of the combined capacitive and inductive elements of the individual transformers so that the transformer cores can be prevented from saturating and thus achieve a high conversion efficiency. More than two transformers can be connected together to further increase the maximum output power capability of the power supply device.

Another object of the present invention is to provide a power supply device having a multiplier which is connected to a secondary winding of the transformer. The multiplier is arranged so as to provide an output signal which has a DC voltage level which is significantly higher than the source voltage level. Preferably, the multiplier includes an assembly of interconnected capacitors and diodes to provide voltage multiplication.

Preferably, the maximum DC voltage level output from the multiplier is at least 500 times the source voltage level when a single transformer is used in the power supply device. Moreover, the maximum power level output from the multiplier can be at least two times the level with a single transformer when multiple transformers are connected in parallel in the power supply device. The maximum power level output from the multiplier thus increases as additional transformers are connected in parallel to a first transformer.

The power supply device may also include sampling circuitry connected electrically between the multiplier and the current regulator. The sampling circuitry provides a voltage indicative of current without drawing more than 0.003% of the power flowing to the electrical load.

Preferably, the current regulator, resonant oscillator, zero voltage level detector, multiplier and sampling circuitry are packaged together such that a profile of the power supply device is less than 0.25 inch in thickness. The power supply device of the present invention can thus assist to maximize the compactness of the device (e.g., a flat screen CRT) in which it is incorporated.

As will be appreciated by those skilled in the art, further embodiments and modifications can be made to the power supply device described herein without departing from the scope and spirit of the present invention.

DESCRIPTION OF THE PREFERRED EMBODIMENTS

Figure 1:
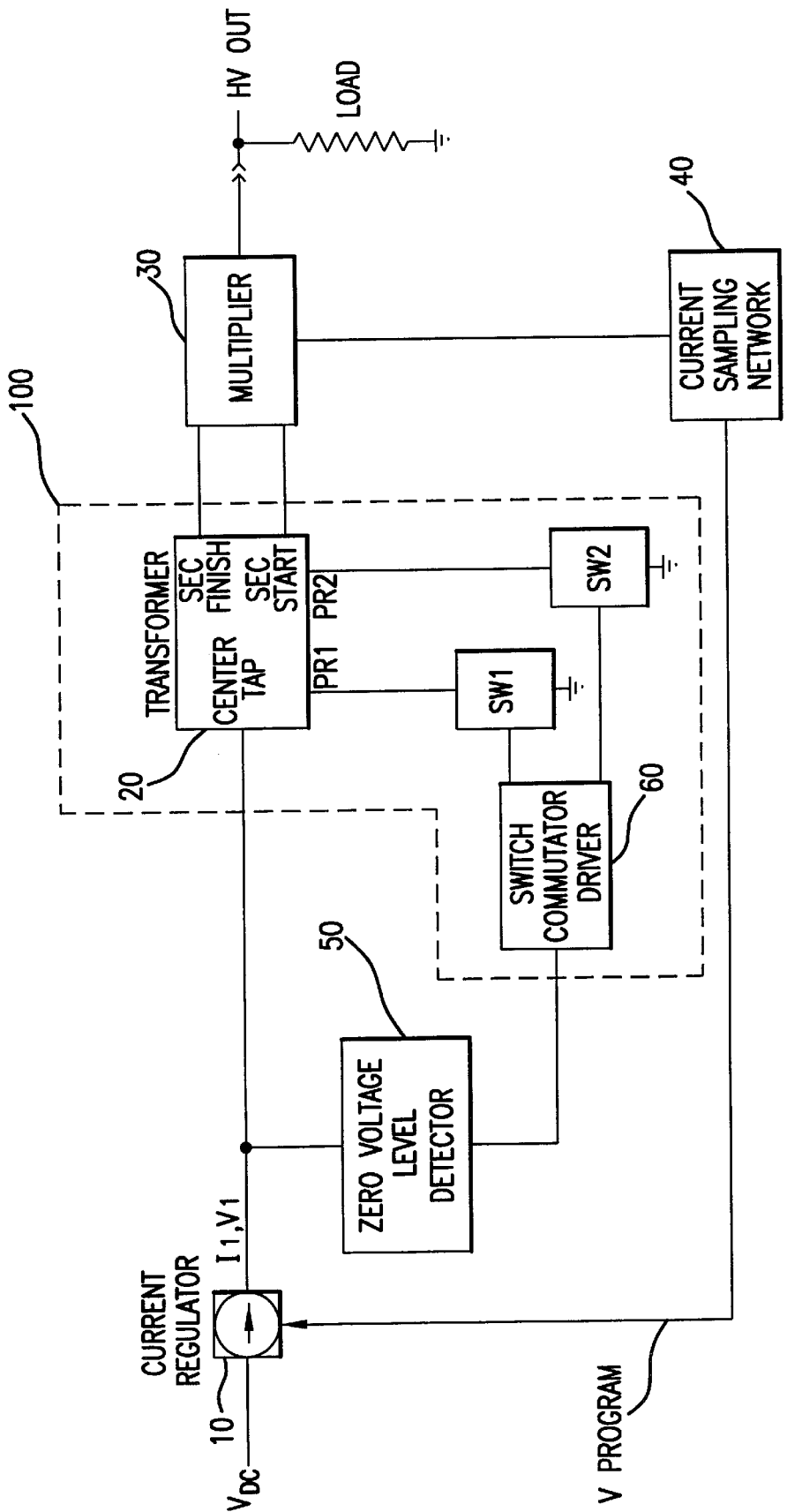
FIG. 1 is a block diagram illustrating a power supply device in accordance with a preferred embodiment of the present invention.

With reference to FIG. 1, a power supply device according to a preferred embodiment of the present invention will now be described.

The illustrated power supply device includes a current regulator 10, a resonant oscillator 100 and a zero voltage level detector 50. The resonant oscillator 100 preferably includes a transformer 20, switches SW1, SW2 and switch commutator driver 60, although it will be understood that suitable alternatives and equivalents can be contemplated by those skilled in the art.

The current regulator 10 receives a DC voltage $V_{DC}$ from a voltage source such as a 5 volt battery to provide an output signal having a voltage V1 and a current I1. The current I1 has a controlled wave shape. The current regulator 10 thus limits the rate of current I1 flowing to the resonant oscillator 100 so that the current I1 is at a constant current source level regardless of the load imposed on it.

Figure 2:
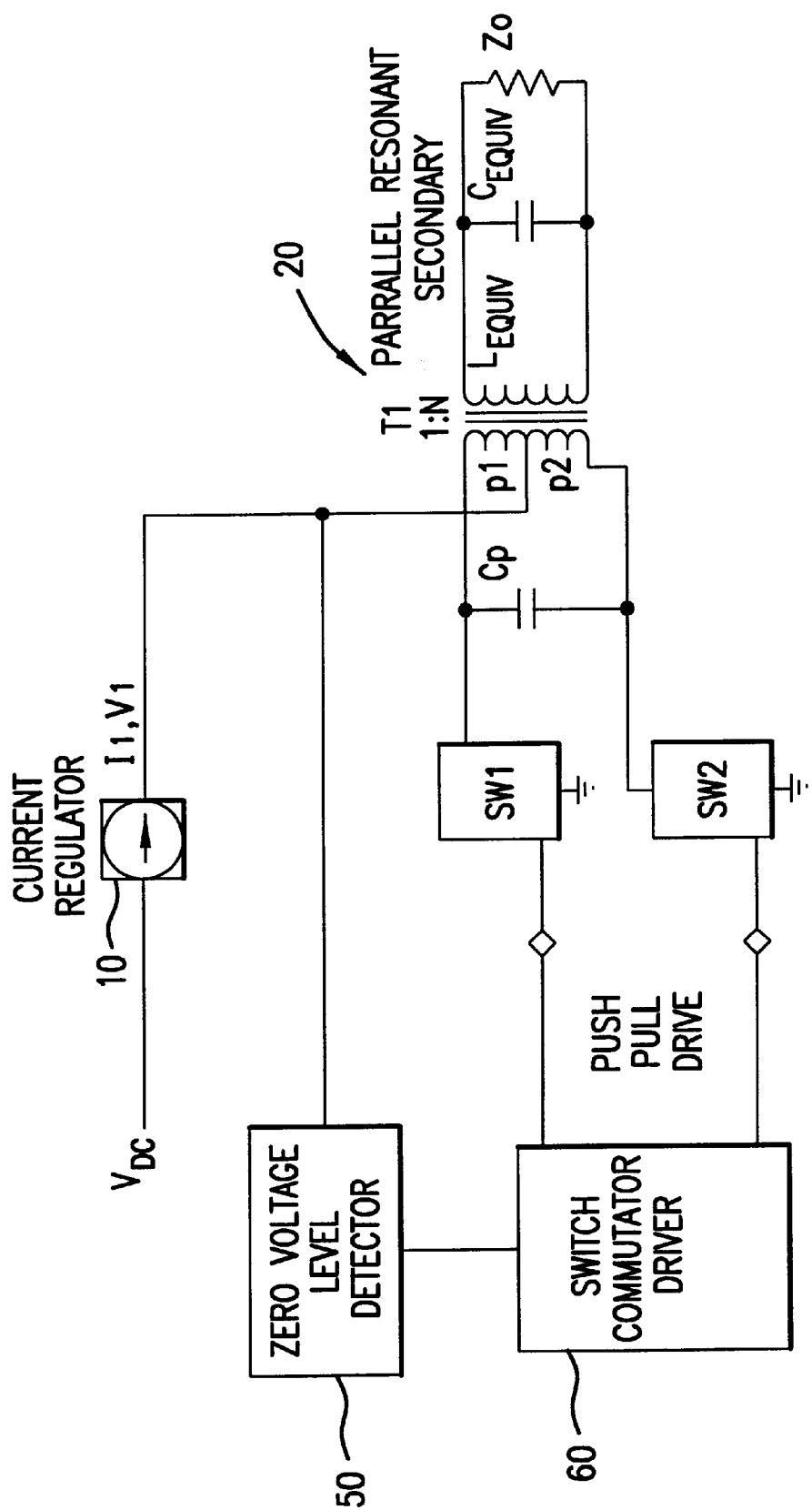
FIG. 2 is a block diagram illustrating an equivalent transformer model of a power supply device in accordance with a preferred embodiment of the present invention.
Figure 3:
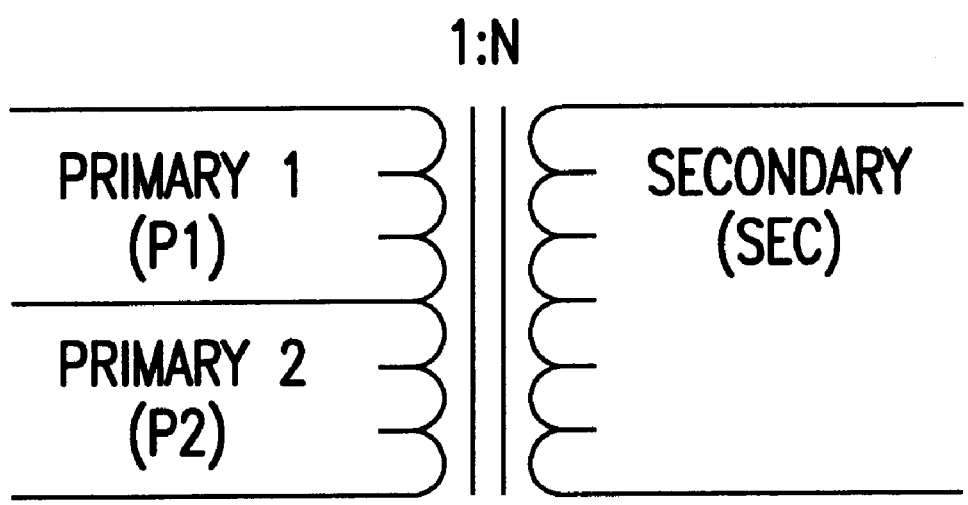
FIG. 3 is a circuit diagram illustrating the transformer of FIG. 2.

As illustrated in FIGS. 2–3, the transformer 20 of the resonant oscillator 100 includes a primary winding and a secondary winding. The primary winding of the transformer 20 has distributed capacitance $C_p$ and the secondary winding of the transformer 20 has a distributed capacitance $C_S$. The primary winding of transformer 20 has winding inductive $L_P$ and the secondary winding has winding inductance $L_S$. The primary winding has a center tap which receives the signal from the current regulator 10 and which divides the primary winding into primary sub-windings P1, P2. One end of primary sub-winding P1 is connected to switch SW1 and one end of sub-winding P2 is connected to switch SW2. Switches SW1, SW2 are connected to switch commutator driver 60 to receive controlling signals therefrom.

The zero voltage level detector 50 detects when the voltage V1 of the signal from the current regulator 10 reaches a zero level. Upon detecting the voltage V1 reaching a zero level, the zero voltage level detector 50 provides an enable signal to trigger the switch commutator driver 60. Upon receiving the enable signal from the zero voltage level detector 50, the switch commutator driver 60 changes the operative states of switches SW1, SW2. Specifically, the switch commutator driver 60 simultaneously operates switches SW1, SW2 in a push-pull mode so that when switch SW1 is closed, switch SW2 is opened, and when SW1 is opened, SW2 is closed.

Figure 10A:
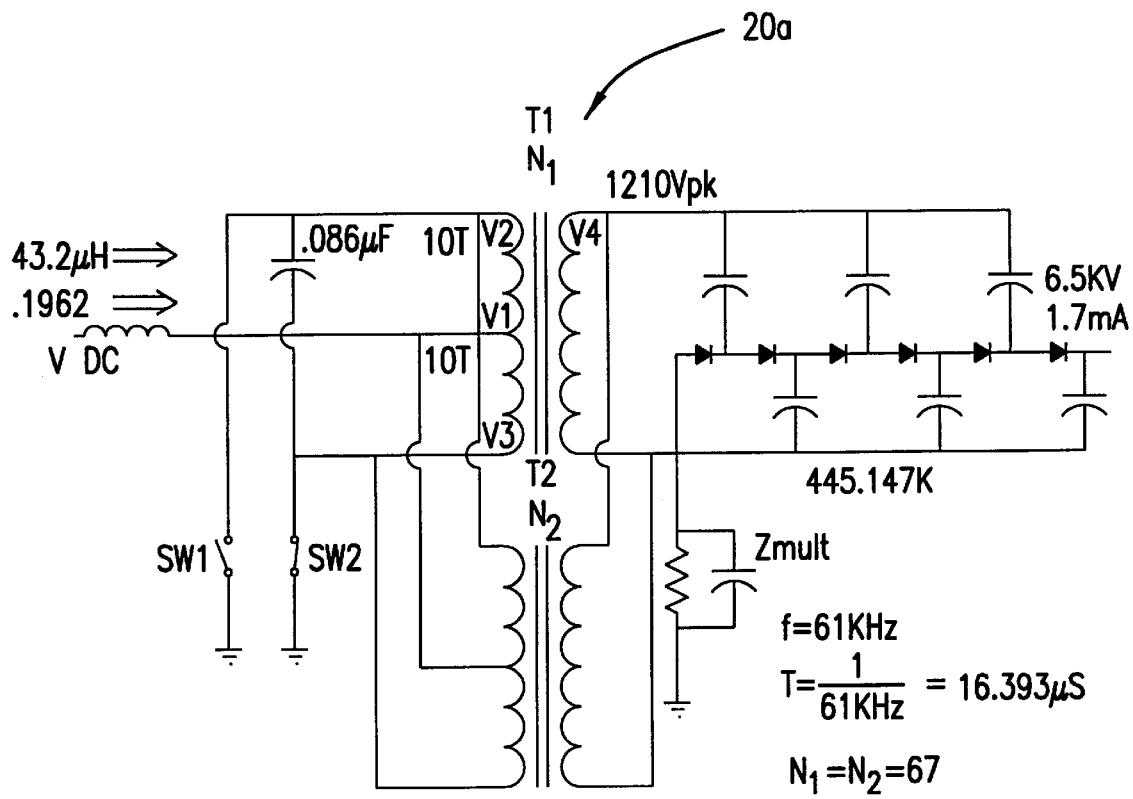
FIG. 10A is a circuit diagram illustrating a power supply device in accordance with an alternative preferred embodiment of the present invention.

A multiplier 30 is electrically connected to the secondary winding of the transformer 20. The multiplier 30 converts the voltage V4 (see, e.g., see FIG. 4A) across the secondary winding into a high voltage output (for example, a voltage output having a voltage level of 4000 volts to 8000 volts) which, in turn, can be applied to the load. The multiplier can be formed by an interconnected array of diodes and capacitors as illustrated in FIG. 10A. Alternative circuitry forming the multiplier 30 is described in related application 08/962, 762, the contents of which are incorporated by reference herein.

The current drawn by the load is sampled by sampling circuitry 40. The sampling circuitry 40, in response to the current being drawn, provides a voltage $V_{PROGRAM}$ which is indicative of the current being drawn by the load. The voltage $V_{PROGRAM}$ is applied to the current regulator 10 which is capable of adjusting the current I1 dependant upon the voltage $V_{PROGRAM}$. The current regulator 10 thus provides dynamic current regulation in a manner dependant upon $V_{PROGRAM}$. Such dynamic control prevents significant deviations in the high voltage output HV OUT which might otherwise occur when the current being drawn by the load changes.

If, for example, the current being drawn by the load increases, this increase incurred is detected by the sampling circuitry 40. Upon detecting the increase, the current sampling network sends an appropriate voltage $V_{PROGRAM}$ to the current regulator 10. The current regulator 10 will chop the voltage VDC by switching on and off a switch provided in the current regulator 10 at a specific rate to keep the current I1 flowing to the center tap of the transformer 20 constant. This results in an increase in $V_1$ to maintain HV out at a constant level.

increases?]Likewise, the current being drawn by the load decreases, this decrease incurred is detected by the sampling circuitry 40. Upon detecting the decrease, the current sampling network sends and appropriate voltage $V_{program}$ to the current regulator 10. The current regulator 10 will chop the voltage VDC by switching on and off a switch provided in the current regulator 10 at a specific rate to keep the current I1 flowing to the increases?]center tap of the transformer 20 constant. This results in a decrease in $V_1$ to maintain HV out at a constant level.

Figure 4A:
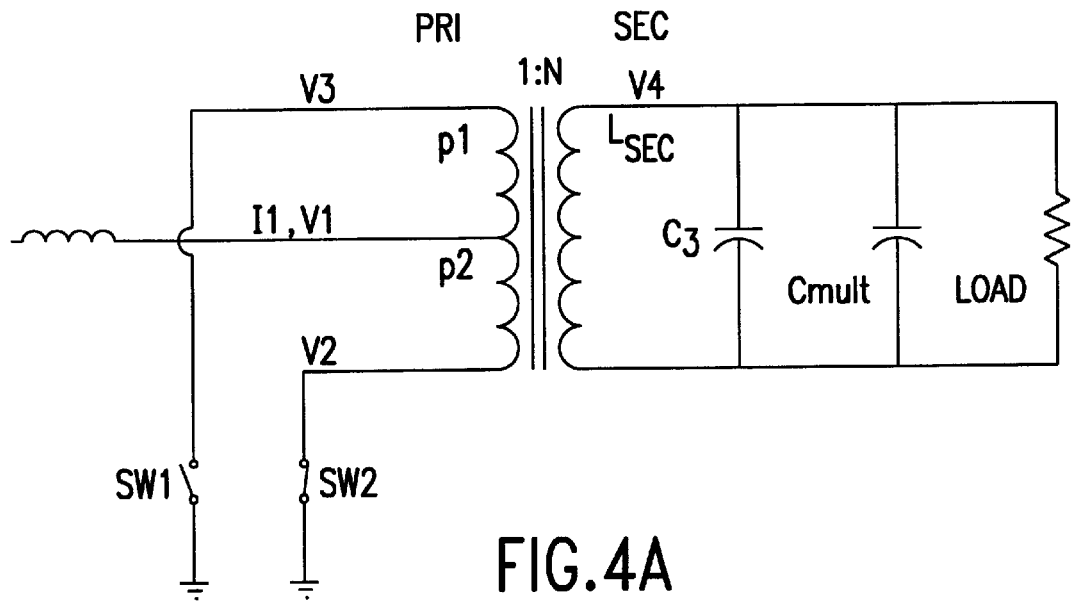
FIG. 4A is a circuit diagram illustrating a power supply device in accordance with the preferred embodiment of FIGS. 1–3.
Figure 4B:
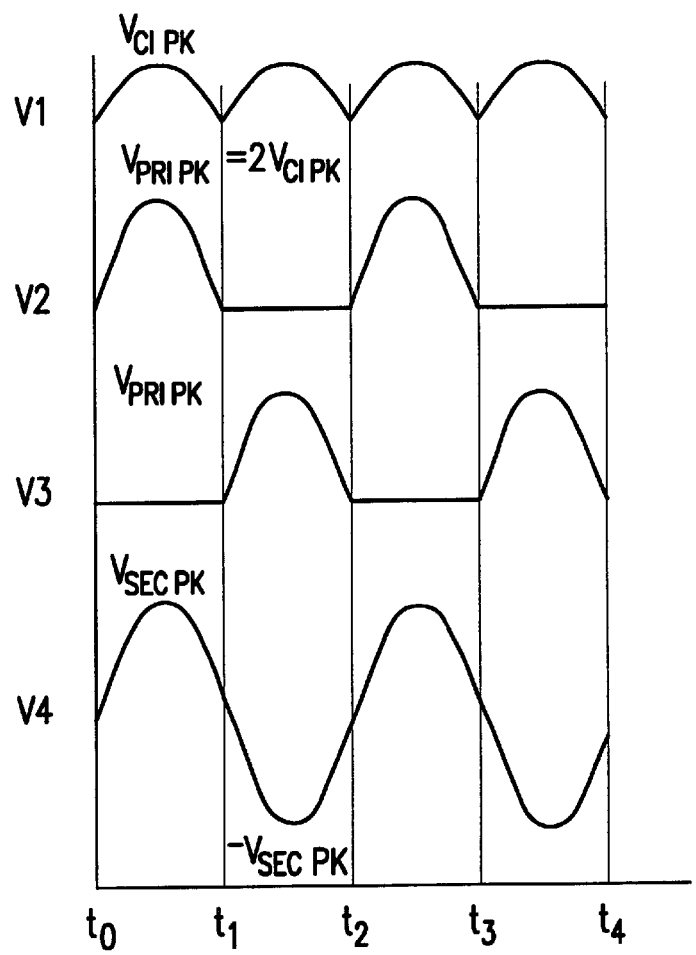
FIG. 4B is a voltage waveform diagram illustrating the operation of the circuit of FIG. 4A.

FIGS. 4A–4B illustrate the operation of the power supply device according to a preferred embodiment of the present invention.

At time $t_o$, switch commutator driver 60 simultaneously closes switch SW1 and opens switch SW2. Voltage V3 is thus clamped to zero volts while voltage V1 of the signal provided to the center tap of the primary winding and voltage V2 rise (and later fall) sinusoidally at the resonant frequency of the resonant oscillator 100. The resonant frequency is determined by the value of the effective inductance $l_p$ and capacitance $C_P$ of the primary winding. As illustrated in FIG. 4B, the peak voltage of V2 is twice the peak voltage of V1.

At time $t_1$, the voltage V1 falls to a zero level. This level is detected by the zero voltage level detector 50 which in turn sends an enable signal to the switch commutator driver 60. The switch commutator driver 60 simultaneously opens switch SW1 and closes SW2 in response to receiving the enable signal. Voltage V2 is thus clamped to a zero level, while voltage V3 rises (and later falls) sinusoidally with voltage V1 at the resonant frequency of the resonant oscillator 100. The peak voltage of V3 is twice that of voltage V1. The elapsed time from time $t_0$ to time $t_1$ is equal to half the resonant period (1/(2·resonant frequency)).

At time $t_2$, voltage V1 again resonates back to a zero level. This is detected by the voltage level detector 50 which in turn sends another enable signal to switch commutator driver 60. Switch commutator driver 60 simultaneously reopens switch SW2 and recloses switch SW1. The voltage waveform of voltages V1, V2 and V3 from time $t_2$ to time $t_4$ then repeats the cycle illustrated between time $t_0$ to time $t_2$. The elapsed time from $t_0$ to $t_2$ and from $t_2$ to $t_4$ is equal to the resonant period (1/resonant frequency).

As illustrated in FIG. 4B, voltage V4 across the secondary winding oscillates between $+V_{sec\ pk}$ (+V2×N) to $-V_{sec\ pk}$ (V3×N), where N is the turn ratio of the transformer. Voltage V4 is then increased by multiplier 30 to provide the necessary high voltage output HV OUT to the load.

As illustrated by FIGS. 4A–4B, the zero voltage level detector 50 enables the resonant oscillator 100 to maintain its resonance. Accordingly, the cycle to cycle energy balance of the resonant oscillator 100 can be maintained. By maintaining the cycle to cycle energy balance of the resonant oscillator 100, additional transformers may be connected in parallel to increase the output power.

Figure 5:
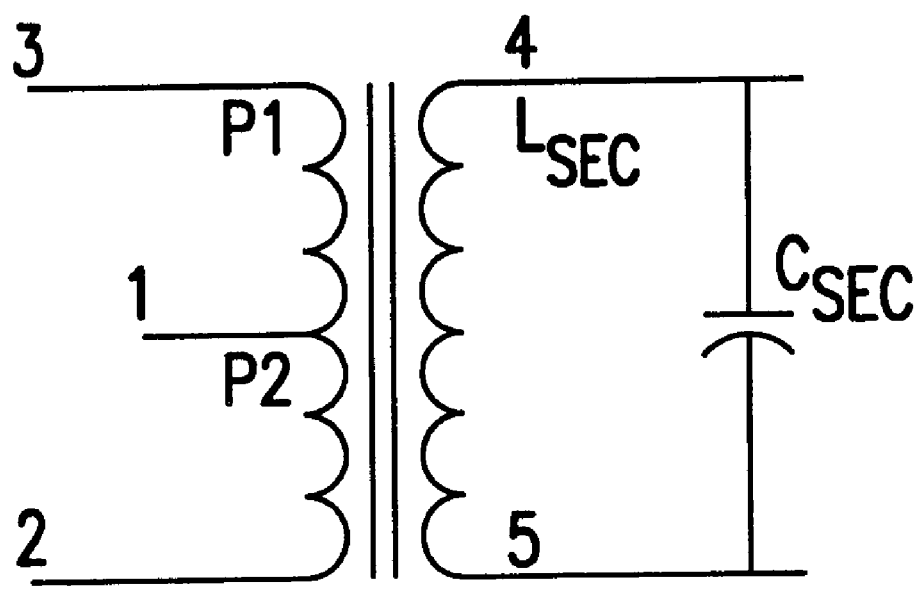
FIG. 5 is a circuit diagram of a transformer in accordance with a preferred embodiment of the present invention.
Figure 6:
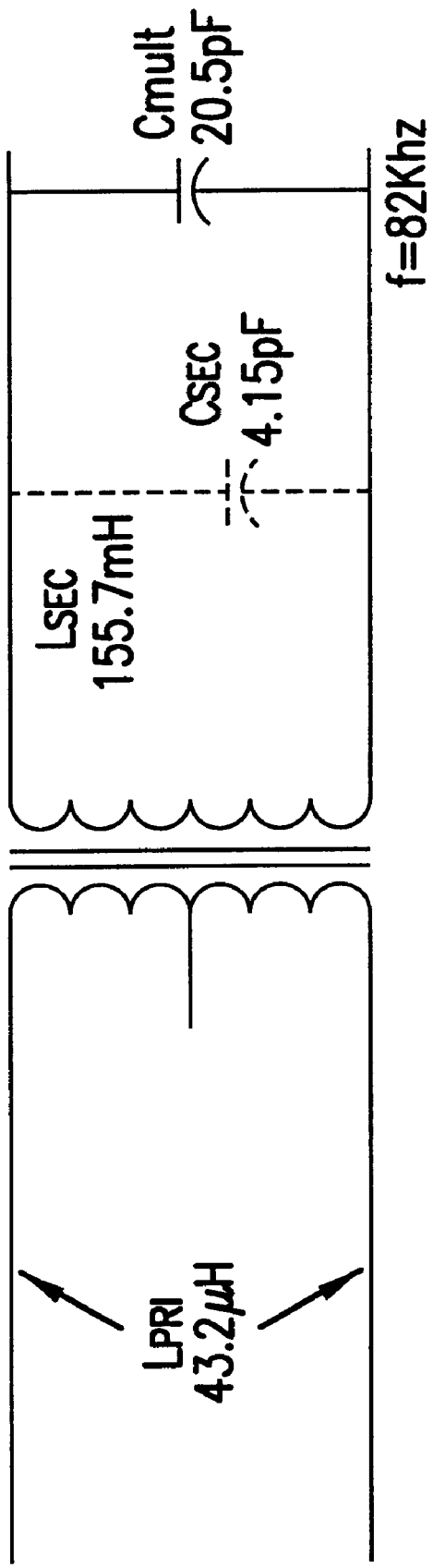
FIG. 6 is a circuit diagram of a transformer in accordance with a preferred embodiment of the present invention.

FIGS. 5–7 illustrate an exemplary transformer model for the power supply device in accordance with the present invention wherein the transformer is a Coiltronics CTX21065 transformer.

Specifically, FIG. 5 illustrates a transformer model of the Coiltronics transformer having nodes 1–5. The Coiltronics transformer has the following characteristics:

Transformer open circuit resonant frequency $F_{oc}$=198 KHz $N_{p1}$ = 10 turns     $L_{p1}$ = 10.80 µH     Nodes 1 & 3

$N_{p2}$ = 10 turns     $L_{p2}$ = 11.10 µH     Nodes 1 & 2

$N_{sec}$ = 1340 turns     $L_{sec}$ = 155.7 mH     Nodes 4 & 5

The calculation for the $A_L$ number for the core to derive the total inductance of both primary sub-windings is:

$$A_L = \frac{\left(\frac{L_{p1}}{10^{-6}}\right)}{N_{p1}^2} \cdot 10^4 = \frac{\left(\frac{10.8 \times 10^{-6}}{10^{-6}}\right)}{10^2} \cdot 10^4 = \frac{10.8}{100} \cdot 10^4 = 1080$$

$$L_{ptotal} = \left(\frac{N_{ptotal}^2 A_L}{10^{-6}}\right) \cdot 10^{-6} = \left(\frac{20^2 \cdot 1080}{104}\right) \cdot 10^{-6} = \qquad 43.2 \cdot 10^{-6}$$

(nodes 2  & 3)                                                    43.2 µH (nodes 2 & 3) 43.2 µH.

The turns ratio from nodes 3 & 2 to 4 & 5 is:

$$\frac{1340}{20} = 67.$$

As illustrated is FIG. 6, the secondary distributed capacitance is:

$$C_{\text{sec}} = \frac{1}{(2\pi f_{oc})^2 L_{\text{sec}}} = \frac{1}{(2\pi 198 \text{ Khz})^2 \cdot 155.7 \text{ mH}} = 4.15 \cdot 10^{-12}$$
$$= 4.15 \text{ pf}.$$

The resonant frequency with multiplier 30 connected is:

$$F_{\text{mc}} = 82 \text{ KHz}$$

$$C_{\text{mc}} = \frac{1}{(2\pi f_{\text{mc}})^2 \cdot L_{\text{sec}}} = \frac{1}{(2\pi 82 \text{ KHz})^2 \cdot 155.7 \text{ mH}} = 24.19 \text{ pf}.$$

Thus, the multiplier effective capacitance is:

$$C_{MULT} = C_{MC} - C_{SEC} = 24.19\text{pf} - 4.14\text{pf} = 20.05\text{pf}.$$

To minimize transformer loss the conversion frequency goal is 61 kHz. Thus, the effective $C_{SEC}$:

$$\text{Effective } C_{\text{SEC}} = \frac{1}{(2\pi 61 \text{ KHz})^2 \cdot 155.7 \text{ mH}} = 43.72 \text{ pf}.$$

The additional capacitance to be added is:

43.72pf−24.19pf=19.53pf.

Figure 7A:
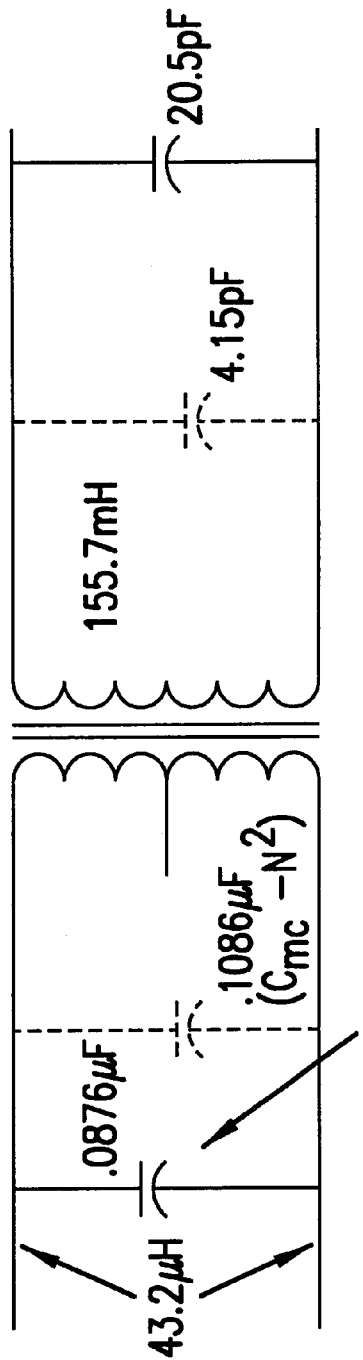
FIGS. 7A–7B are circuit diagrams of a transformer in accordance with a preferred embodiment of the present invention.

As illustrated in FIG. 7a, it is preferable to reflect the secondary side capacitance to the primary side and add the additional capacitance to the primary winding. Accordingly, $$C_{prc} = C_{sec} \cdot N^2$$

$$N^2 = 67^2 = 4489$$

$C_{mc}$ reflected to primary side=24.19pf·$67^2$=0.10854μf $C_{effective}$ reflected to primary side=43.72pf·$67^2$=0.1962μf.

The additional capacitance to be added to the primary side is:

0.1962μf−0.1085μf=0.0876μf.

Figure 7B:
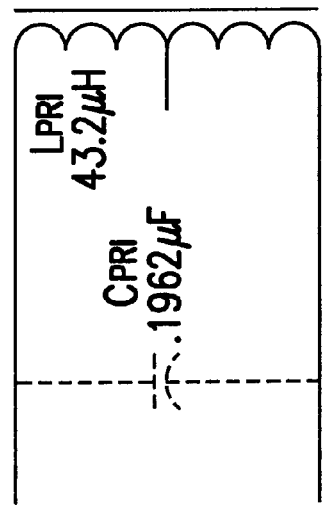

As illustrated in FIG. 7b, the equivalent primary circuit has a resonant frequency=

$$\frac{1}{2\pi\sqrt{LC}} = \frac{1}{2\pi\sqrt{43.2 \text{ μH} \cdot .1962 \text{ μF}}} = 54.62 \text{ Khz}.$$

Figure 8:
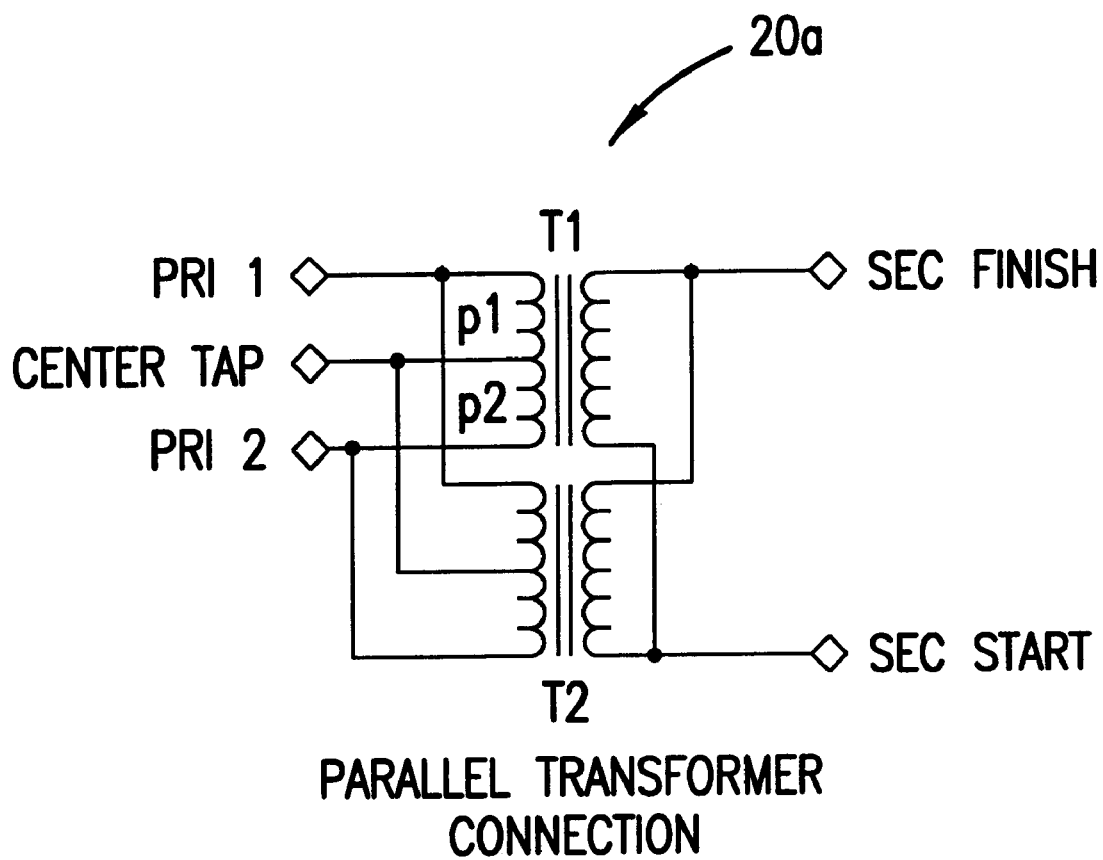
FIG. 8 is a circuit diagram illustrating an alternative preferred embodiment of a transformer circuit of the present invention.

FIG. 8 illustrates an alternative embodiment of the present invention in which resonant circuit 100 of the power supply device incorporates two transformers (labeled as 20a) which are connected directly in parallel to obtain an increased maximum output power capability. As illustrated in FIG. 8, the center taps of the primary windings of transformers T1 and T2 are connected as a common node. Similarly, an end of sub-winding P1 of transformer T1 is connected to an end of sub-winding P1 of transformer T2 as a common node and an end of sub-winding P2 of transformer T1 is connected to an end of sub-winding P2 of transformer T2 as a common node. Similarly, the start and finishing ends of the secondary winding of transformer T1 and transformer T2 are respectively connected together.

Figure 9A:
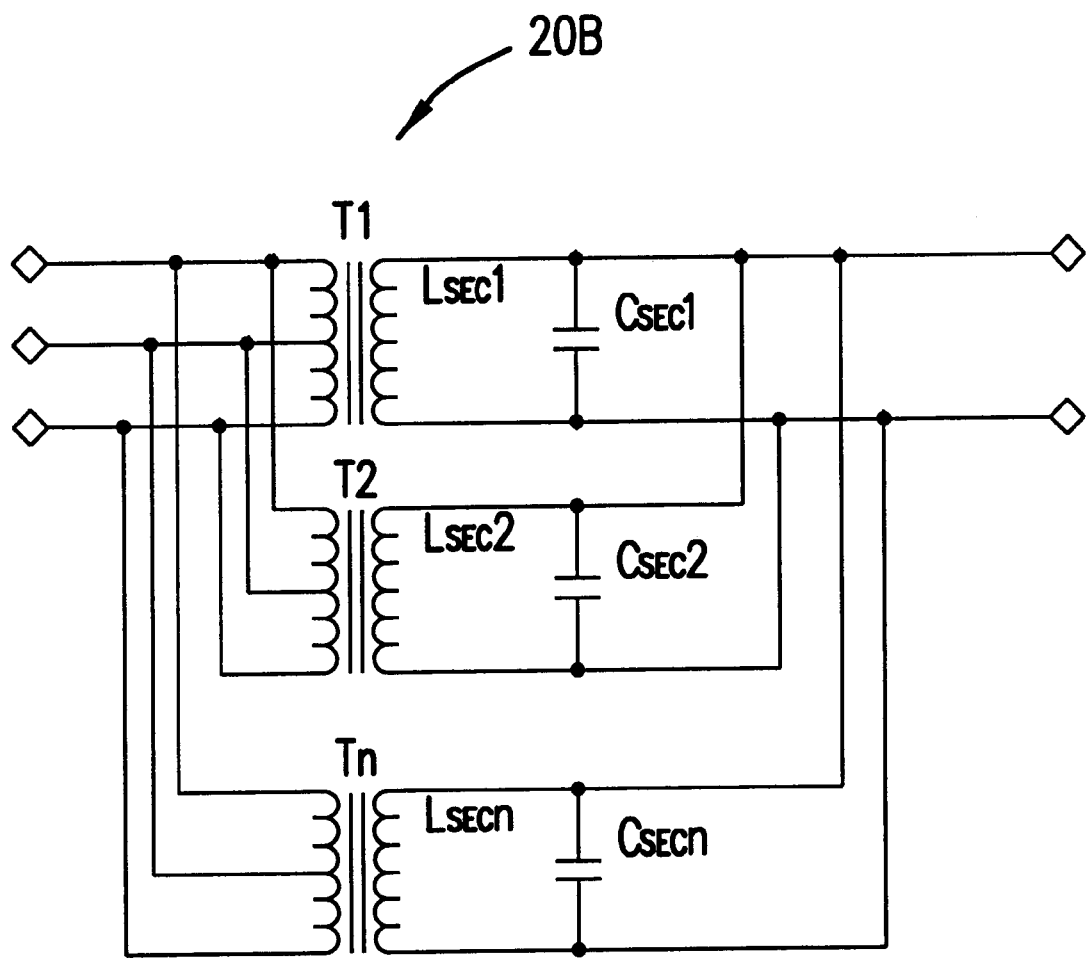
FIGS. 9A–9B are circuit diagrams illustrating another alternative preferred embodiment of a transformer circuit of the present invention.
Figure 9B:
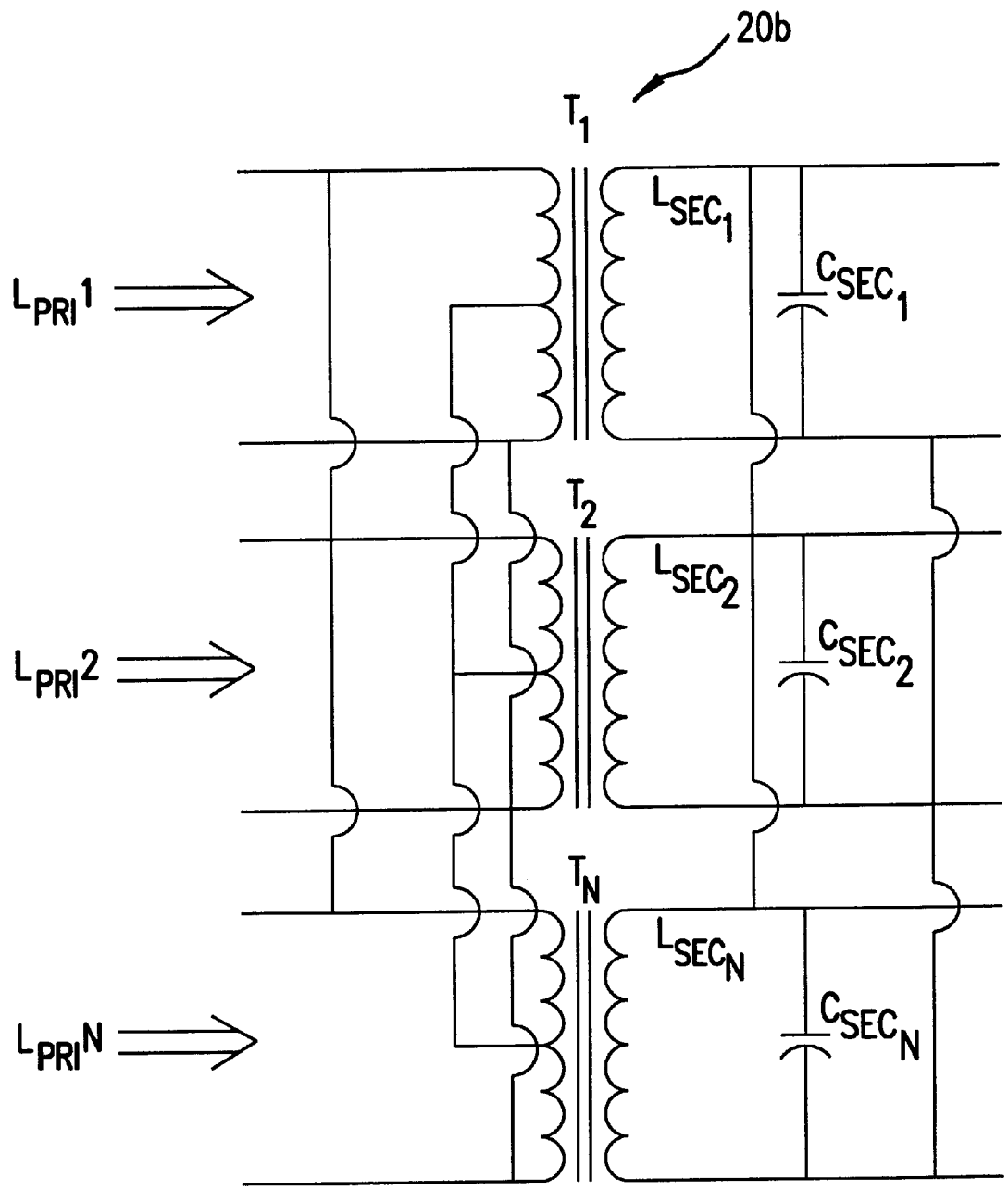

FIGS. 9A–9B illustrate another alternative embodiment of the present invention in which the power supply device incorporates three transformers (labeled jointly as 20b) which are connected directly in parallel to obtain an increased maximum output power capability. The three or more transformers are connected directly in parallel in a manner similar to FIG. 8. For example, the center taps of each of the primary windings are connected together as a common node. The ends of each sub-winding P1 and each sub-winding P2 are connected as common nodes, respectively.

As discussed above with respect to FIGS. 1–4, the operation of the zero voltage level detector allows the transformer of the resonant oscillator 100 to maintain a cycle to cycle energy balance. Due to the maintenance of this energy balance, an additional transformer can be connected directly in parallel to the first transformer. The parallel connected transformer configuration can be viewed as a single element, comprised of the lumped inductive and capacitive elements of the individual transformers. As is the case with the single transformer, the parallel connected transformers of the oscillator circuit 100 operate in a resonant mode at the resonant frequency of the lumped elements. The transformer cores can thus be prevented from saturating and any detrimental interaction between the transformers can be eliminated. The parallel connected transformers can thus achieve a high conversion efficiency. Moreover, since any number of transformers can be connected directly in parallel, the power supply device of the present invention can be easily adapted to provide a higher output power with minimal engineering effort because the core circuitry (e.g., the transformer) remains the same.

Figure 10B:
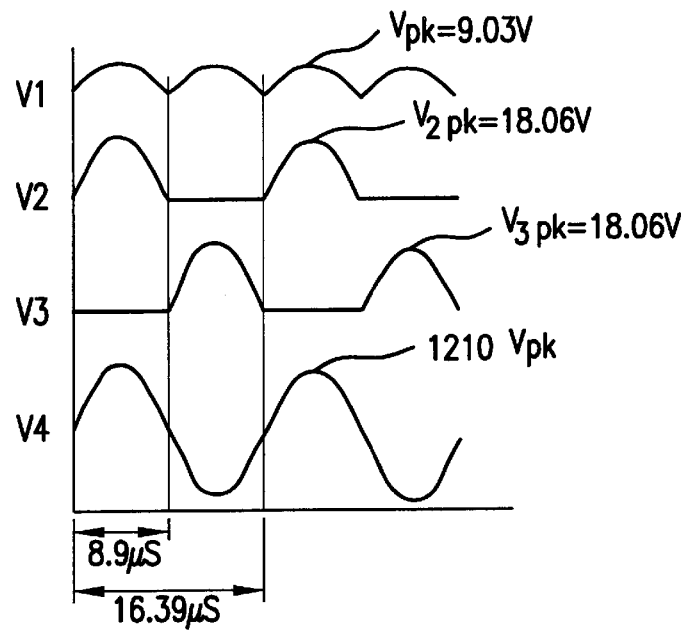
FIG. 10B is a voltage waveform diagram illustrating the operation of the circuit of FIG. 10A.

FIGS. 10A–10B illustrate the circuit and operation of a power supply device in accordance with the present invention which includes two parallel connected transformers T1, T2 as part of the resonant oscillator 100. The resonant frequency of the resonant oscillator 100 illustrated in FIG. 10A is 61 kHz as calculated by $$\frac{1}{2\pi\sqrt{L_{PRI}(equiv)C_{PRI}(equiv)}}.$$

Thus, the resonant period of oscillation is 1/61KHZ= 16.393μS. The turn ratio of transformers T1 and T2 is 67.

FIG. 10B illustrates the operation of the circuit having two transformers as part of the resonant oscillator 100, which is similar to that described in FIG. 4B above for the circuit having a single transformer.

At time $t_0$, switch commutator driver 60 simultaneously closes SW1 and opens switch SW2. Thus, voltage V3 is clamped to zero, and voltage V1 and voltage V2 rise sinusoidally at the resonant frequency of 61 KHZ. The peak voltage V2 is two times the level of voltage V1. In the exemplary embodiment, voltage V1 is 9.03 volts and thus the peak voltage V2 is 18.06 volts (2×9.03 volts).

After 8.19 μS (half of the resonant period T of 16.393 μS), the voltage V1 reaches a zero level. This is detected by the zero voltage level detector 60 which in turn closes switch SW2 and opens switch SW1. Voltage V2 is now clamped to zero while voltage V1 and voltage V3 rise sinusoidally at the resonant frequency of 61 KHZ. Like V2, the peak voltage of voltage V3 is 18.06 volts (2×9.03 volts).

After the resonant period has elapsed (16.393 μS after time $t_0$), the voltage V1 again returns to a zero level. This is detected by the zero level detector 60 which outputs a signal to enable the switch driver 60 to reclose switch SW1 and reopen switch SW2. The resonant cycle will then repeat as discussed above.

The voltage V4 is equal to V2 (or V3) times the turn ratio N. In this exemplary embodiment, the voltage V4 will thus be equal to 1210 (18.06v×67). The voltage V4 is then multiplied by the multiplier 30 to provide a high voltage output HV OUT to be applied to the load. In the exemplary embodiment illustrated in FIG. 10A, the multiplier will convert the voltage V4 having a peak voltage of 1210 to a peak voltage HV OUT of 6.5 KV.

Figure 11A:
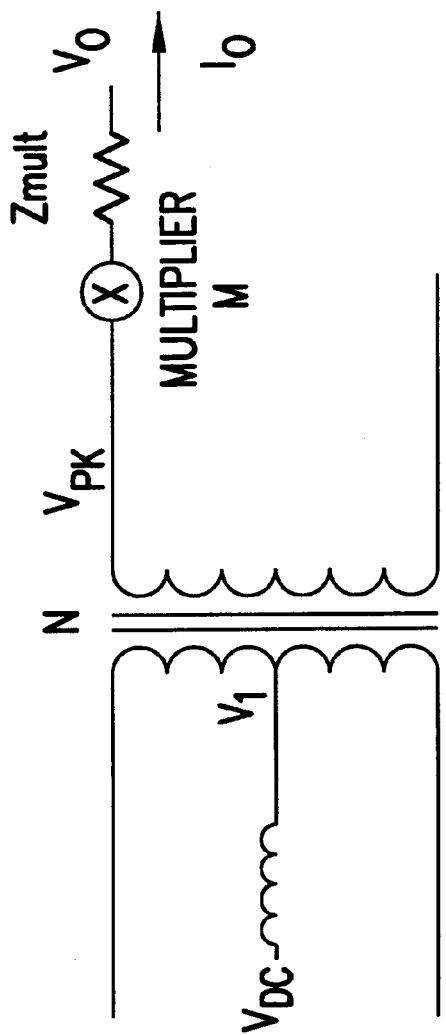
FIG. 11A is a circuit diagram illustrating a power supply device according to a preferred embodiment of the present invention.
Figure 11B:
FIG. 11B is a voltage waveform diagram illustrating the operation of the circuit of FIG. 11A.
Figure 12:
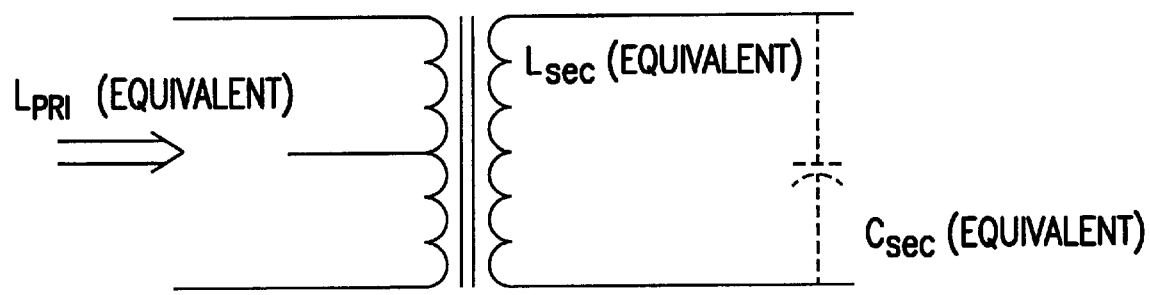
FIG. 12 is a circuit diagram illustrating an equivalent transformer model of a power supply device of the present invention.

FIGS. 11A–12 illustrate the development and implementation of the circuit of FIG. 10. As illustrated in FIG. 11A, due to sinewave of the resonant circuit, voltage $V_{DC}$ is:

$$V_{DC} = \frac{2V_1}{\pi} = \frac{V_2}{\pi} = \frac{V_3}{\pi} = \frac{18.06}{\pi} = 5.748 \text{ v}.$$

As illustrated in FIG. 11b, voltage $V_1$ is a half sinewave at 2× the resonant frequency:

$$t_R = \frac{1}{F_R} = t_1 = \frac{\pi}{t_1}.$$

$V_1$ as a function of time is:

$$V_1(t) = V_p \text{SIN}(wt).$$

The calculation for the angular frequency is:

$$W = 2\pi f = \frac{2\pi}{2t_1} = \frac{\pi}{t_1}.$$

$$V_p = \frac{\pi}{2} V_{DC} \text{ or } V_{DC} = \frac{2V_p}{\pi}.$$

The calculation for $V_{pk}$ related to output voltage is:

$$V_{pk} = \frac{\left(\frac{I_o \cdot Z_{MULT} + V_o}{M}\right)}{2N}.$$

The primary winding output voltage as a function of input voltage is:

$$V_{pk} = \frac{\pi}{2} V_{IN} = \frac{\left(\frac{I_o \cdot Z_{MULT} + V_o}{M}\right)}{2N}.$$

The primary output voltage as a function of input voltage is:

$$V_p = \frac{\pi}{2} V_{IN} = \frac{\left(\frac{I_o \cdot Z_{MULT} + V_o}{M}\right)}{2N}$$

$$V_p = \frac{\pi}{2} V_{IN} = \frac{\left(\frac{I_o \cdot Z_{MULT} = V_o}{M}\right)}{2N}$$

$$\frac{\pi}{2} V_{IN} \frac{\left(\frac{I_o \cdot Z_{MULT} + V_o}{M}\right)}{2N}$$

$$V_{IN} \cdot \frac{\pi}{2} 2N = \frac{I_o \cdot Z_{MULT} + V_o}{M}$$

OR $$V_O = (V_{IN} \cdot \pi \cdot N \cdot M - I_{O \cdot ZMULT}).$$

FIG. 12 illustrates an electrical equivalent model of multiple connected transformers. As will appreciated by those skilled in the art, the equivalent inductance is $L_{PRI}$ (Equivalent)=$L_{PRI}1+L_{PRI}2+L_{PRI}N$. Similarly, the equivalent inductance for the secondary winding of the transformers is $L_{SEC}$ (Equivalent)=$L_{SEC}1+L_{SEC}2+L_{SEC}N$ and the equivalent capacitance of the secondary winding of the transformers is $$C_{SEC}(\text{Equivalent}) = \frac{1}{\frac{1}{C_{SEC}1} + \frac{1}{C_{SEC}2} + \frac{1}{C_{SEC}N}}.$$

The effective resonant frequency of the secondary winding of the transformers is Resonant Frequency:

$$F_{RSEC}(\text{Equivalent}) = \frac{1}{2\pi\sqrt{L_{SEC}(equiv)C_{sec}(equiv)}}.$$

The effective resonant frequency of the primary winding of the transformer is:

$$F_{RPRI}(\text{Equivalent}) = \frac{1}{2\pi\sqrt{L_{PRI}(equiv)C_{PRI}(equiv)}}.$$

While the invention has been described in its preferred embodiments, it is to be understood that the words which have been used are words of description rather than limitation, and that changes within the view of the appending claims may be made without departing from the true scope and spirit of the invention.

What is claimed is:

1. A power supply device comprising:
   a current regulator, said current regulator receiving a source voltage and producing a first signal having a first voltage and a first current;
   a resonant oscillator coupled to said current regulator, said resonant oscillator including a first transformer; and
   a zero voltage level detector, said detector detecting said first voltage reaching a zero level and providing an enable signal to said resonant oscillator in response to the detection of said first voltage reaching said zero level so that a cycle to cycle flux balance of said transformer is maintained.

2. A power supply device of claim 1, wherein said resonant oscillator further includes:
   transformer;
   first and second switches coupled to a primary winding of said first transformer; and
   a switch driver coupled to said switches and said zero voltage level detector, said switch driver receiving said enable signal from said zero voltage level detector and opening and closing said switches in response to receiving said enable signal.

3. A power supply device of claim 2, wherein said switch driver opens and closes said switches in a push-pull mode.

4. A power supply device of claim 2, wherein:
said primary winding has a first end, a second end and a center tap;
said first switch is connected to said first end of said primary winding and said second switch is connected to said second end of said primary winding; and
said current regulator is connected to said center tap of said primary winding.

5. A power supply device of claim 2, further comprising a voltage multiplier coupled to a secondary winding of said transformer.

6. A power supply device of claim 5, further comprising a current sampling circuit coupled to said voltage multiplier and said current regulator.

7. A power supply device of claim 6, wherein said current regulator, said resonant oscillator, said zero voltage level detector, said voltage multiplier and said current sampling circuit are packaged together such that a profile of said power supply device is less than a quarter inch in thickness.

8. A power supply device of claim 5, wherein an output voltage from said multiplier has a level at least 500 times a level of said source voltage.

9. A power supply device of claim 5, wherein said voltage multiplier comprises an interconnected assembly of capacitors and diodes.

10. A power supply device of claim 2, wherein said resonant oscillator further comprises a second transformer which is connected directly in parallel to said first transformer to thereby increase a maximum power output capability of said power supply device.

11. The power supply device of claim 10, wherein said second transformer connected directly in parallel to said first transformer increases said maximum power output of said power supply by at least two times with respect to said power supply device having only said first transformer.

12. The power supply device of claim 1, wherein said resonant oscillator further comprises one or more additional transformers which is connected directly in parallel to said first transformer to thereby increase a maximum output capability of said power supply device.

13. A power supply device comprising:
current regulating means for receiving a voltage source and producing a first signal having a first voltage and a first current;
resonant oscillating means for receiving said first signal and providing a cyclic transfer of energy, said resonant oscillating means including a first transformer; and
zero voltage level detecting means for detecting when said first voltage reaches a zero level and providing an enable signal to said resonant oscillating means when said first voltage reaches said zero level so that a cycle to cycle flux balance of said first transformer is maintained.

14. The power supply device of claim 13, wherein said resonant oscillating means further comprises one or more additional transformers which is connected directly in parallel to said first transformer to thereby increase a maximum output capability of said power supply device.

15. A power supply device of claim 13, wherein said resonant oscillating means further includes:
transformer;
a switching means for controlling the current through a primary winding of said first transformer; and
a switching driving means for receiving said enable signal from said zero voltage level detecting means and for controlling the operative state of said switch means in response to receiving said enable signal.

16. A power supply device of claim 15, wherein said switch driving means controls an operative state of said switch means so that said switch means is operated in a push-pull mode.

17. The power supply device of claim 15, wherein:
said primary winding of said first transformer has a first end, a second end and a center tap;
said switching means is connected to said first and second ends of said primary winding; and
said current regulating means is connected to said center tap of said primary winding.

18. The power supply device of claim 15, wherein said resonant oscillating means further comprises a second transformer which is connected directly in parallel to said first transformer to thereby increase a maximum power output capability of said power supply device.

19. The power supply device of claim 18, wherein said second transformer connected directly in parallel to said first transformer increases said maximum power output of said power supply by at least two times with respect to said power supply device having only said first transformer.

20. The power supply device of claim 15, further comprising a voltage multiplying means coupled to a secondary winding of said transformer for multiplying a voltage across said secondary winding.

21. The power supply device of claim 20, wherein an output voltage from said voltage multiplying means has a level 500 times a level of said source voltage.

22. The power supply device of claim 20, wherein said voltage multiplying means comprises an interconnected assembly of capacitors and diodes.

23. The power supply device of claim 20, further comprising a current sampling means coupled to said voltage multiplying means and said current regulating means for providing a voltage which is indicative of current.

24. The power supply device of claim 23, wherein said current regulating means, said resonant oscillating means, said zero voltage level detecting means, said voltage multiplying means and said current sampling means are packaged together such that a profile of said power supply device is less than a quarter inch in thickness.

25. A power supply device comprising:
a current regulator, said current regulator receiving a source voltage and producing a first signal having a first voltage and a first current;
a resonant oscillator including:
a first transformer having a primary winding with first and second ends and a center tap, said first transformer coupled to said current regulator to receive said first signal;
a second transformer having a primary winding with first and second ends and a center tap, said first transformer and said being connected directly in parallel so that said first ends of the primary windings of said first and second transformers form a common node, said second ends of the primary windings of said first and second transformers form a common node, and said center taps of the primary windings of said first and second transformers form a common node;
first and second switches coupled to said first transformer and said second transformer; and
a switch driver coupled to said switches to open and close said switches; and
a zero voltage level detector coupled to said switch driver, said detector detecting said first voltage reaching a zero level and providing an enable signal to said switch driver of said resonant oscillator to open and close said switches in response to said first voltage reaching said zero level so that a cycle to cycle flux balance of said transformers is maintained.

26. The power supply device of claim 25, wherein said switch driver opens and closes said switches in a push-pull mode.

27. The power supply device of claim 25, wherein said first switch is connected to said first ends of the primary windings of said first and second transformers and said second switch is connected to said second ends of the primary windings of said first and second transformers; and said current regulator is connected to said center taps of the primary windings of said first and second transformers.

28. The power supply device of claim 25, wherein said resonant oscillator further comprises one or more additional transformers which is connected directly in parallel to said first and second transformers to thereby increase a maximum output capability of said power supply device.

29. The power supply device of claim 25, further comprising a voltage multiplier coupled to a secondary winding of said first transformer and a secondary winding of said second transformer.

30. The power supply device of claim 29, wherein an output voltage from said multiplier has a level at least 500 times a level of said source voltagesaid source.

31. The power supply device of claim 29, wherein said multiplier comprises an assembly of capacitors and diodes.

32. The power supply device of claim 29, further comprising a current sampling circuit coupled to said voltage multiplier and said current regulator.

33. The current supply device of claim 32, wherein said current regulator, said resonant oscillator, said zero voltage level detector, said voltage multiplier and said current sampling circuit are packaged together such that a profile of said power supply device is less than a quarter-inch in thickness.

* * * * *